United States Patent
Coscia et al.

(10) Patent No.: US 10,610,845 B2
(45) Date of Patent: Apr. 7, 2020

(54) EXHAUST SYSTEM FOR A STEAM REFORMER AND BEARING THEREFOR

(71) Applicant: L'Air Liquide, Societe Anonyme pour l'Etude et l'Exploitation des Procedes Georges Claude, Paris (FR)

(72) Inventors: Antonio Coscia, Hadamar (DE); Lukas Spies, Eiterfeld (DE)

(73) Assignee: L'Air Liquide Societe Anonyme Pour L'Etude Et L'Exploitation Des Procedes George Claude, Paris (FR)

(*) Notice: Subject to any disclaimer, the term of this patent is extended or adjusted under 35 U.S.C. 154(b) by 190 days.

(21) Appl. No.: 15/834,938

(22) Filed: Dec. 7, 2017

(65) Prior Publication Data
US 2018/0093238 A1 Apr. 5, 2018

Related U.S. Application Data

(62) Division of application No. 14/419,894, filed as application No. PCT/EP2013/066061 on Jul. 31, 2013, now Pat. No. 9,868,101.

(30) Foreign Application Priority Data

Aug. 9, 2012 (DE) .................. 10 2012 015 667

(51) Int. Cl.
*B01J 8/06* (2006.01)
*B01J 8/00* (2006.01)
*C01B 3/38* (2006.01)

(52) U.S. Cl.
CPC .............. *B01J 8/062* (2013.01); *B01J 8/008* (2013.01); *B01J 8/065* (2013.01); *C01B 3/38* (2013.01);
(Continued)

(58) Field of Classification Search
CPC ........ B01J 8/062; B01J 19/2425; B01J 8/065; B01J 4/001; B01J 8/008; C10G 9/20
See application file for complete search history.

(56) References Cited

U.S. PATENT DOCUMENTS 2,666,692 A * 1/1954 Dolezal .................. B01J 8/062
422/652
3,062,197 A 11/1962 Fleischer
(Continued)

FOREIGN PATENT DOCUMENTS

DE 10 2006 022898 9/2007

OTHER PUBLICATIONS

International Search Report for PCT/EP2013/066061, dated Mar. 5, 2014.
International Preliminary Report on Patentability for PCT/EP2013/066061, dated Feb. 19, 2015.

*Primary Examiner* — Imran Akram
(74) *Attorney, Agent, or Firm* — Justin K. Murray

(57) ABSTRACT

An exhaust system for a steam reformer comprises at least one longitudinal collecting tube, wherein along the longitudinal axis of the longitudinal collecting tube ports for connection to catalyst tubes are provided, which in the connected condition are aligned parallel to each other and vertically to the longitudinal collecting tube, a transverse collector which is connected to the at least one longitudinal collecting tube and has a longitudinal axis which extends vertically to the at least one longitudinal collecting tube and vertically to the catalyst tubes, wherein the longitudinal collecting tube is formed as hot exhaust system and the transverse collector is formed as cold exhaust system. The transverse collector is arranged on a side of the longitudinal collecting tube facing away from the ports centrally to the longitudinal collecting tube.

10 Claims, 3 Drawing Sheets

(52) U.S. Cl.
CPC ... *B01J 2208/06* (2013.01); *C01B 2203/0233* (2013.01); *F28F 2265/26* (2013.01)

(56) References Cited

U.S. PATENT DOCUMENTS

| | | | |
|---|---|---|---|
| 3,172,739 A | | 3/1965 | Koniewiez |
| 3,361,118 A | | 1/1968 | Breckenridge et al. |
| 3,460,924 A | | 8/1969 | O'Sullivan |
| 3,467,503 A | | 9/1969 | Juric |
| 3,600,141 A | | 8/1971 | Mevenkamp et al. |
| 3,607,130 A | | 9/1971 | Arthur et al. |
| 3,768,980 A | | 10/1973 | Andersen |
| 3,850,453 A | * | 11/1974 | Bentley .................. F01N 13/14 285/47 |
| 4,210,411 A | * | 7/1980 | Ward .................... F23D 11/002 431/160 |
| 4,647,436 A | | 3/1987 | Herbort et al. |
| 5,380,502 A | | 1/1995 | Murphy et al. |
| 5,484,577 A | | 1/1996 | Buswell et al. |
| 5,799,395 A | * | 9/1998 | Nording .................. F01N 13/08 29/890.036 |
| 2003/0115799 A1 | | 6/2003 | Docter et al. |
| 2004/0124075 A1 | | 7/2004 | Nogueira, Jr. |
| 2008/0083216 A1 | * | 4/2008 | Claudinon ............ F01N 13/102 60/320 |
| 2011/0146255 A1 | * | 6/2011 | Hildebrand ......... F01N 13/1811 60/324 |
| 2012/0126177 A1 | | 5/2012 | Meissner et al. |

\* cited by examiner

EXHAUST SYSTEM FOR A STEAM REFORMER AND BEARING THEREFOR

CROSS-REFERENCE TO RELATED APPLICATIONS

This application is a divisional application of application Ser. No. 14/419,894, filed Feb. 5, 2015, which is a § 371 of International PCT Application PCT/EP2013/066061, entitled "EXHAUST SYSTEM FOR A STEAM REFORMER AND BEARING THEREFOR" filed Jul. 31, 2013, which claims priority from DE 10 2012 015 667.7 filed Aug. 9, 2012, the disclosures of which are hereby incorporated by reference herein in their entireties.

FIELD OF THE INVENTION

The present invention relates to an exhaust system for a steam reformer with at least one longitudinal collecting tube, wherein along the longitudinal axis of the longitudinal collecting tube ports for connection to catalyst tubes are provided, which in the connected condition are aligned parallel to each other and vertical to the longitudinal collecting tube, a transverse collector which is connected to the at least one longitudinal collecting tube and has a longitudinal axis which extends vertically to the longitudinal collecting tube and vertically to the catalyst tubes, wherein the longitudinal collecting tube is formed as hot exhaust system and the transverse collector is formed as cold exhaust system. The invention furthermore relates to a bearing for supporting the exhaust system according to the invention as well as a steam reformer equipped therewith, and to the use of the steam reformer for producing a synthesis gas containing hydrogen.

BACKGROUND

Steam reformers in the form of tubular reforming furnaces are used for producing $H_2$/CO-containing process gases from light hydrocarbons and steam. The reformed gas, a synthesis gas rich in hydrogen, is generated by a reaction of a supplied gas (feed gas) which takes place in the catalyst tubes. Steam reformers of this type generally consist of a furnace chamber which is heated by means of a burner. The catalyst tubes are arranged in the furnace chamber and filled with a catalytic material. The catalyst tubes mostly are positioned vertically in the furnace chamber in groups spaced in parallel, wherein they are divided into several horizontal rows. The heat in the furnace chamber is transmitted to the catalyst tubes, while the same are supplied with the feed gas from above. The introduced gas is heated in the catalyst tubes, and the reaction for producing the product gas takes place. From steam and natural gas, for example $H_2$ and CO are obtained. For discharging the product gas, an exhaust system with collecting tubes, so-called longitudinal collecting tubes, extending horizontally and vertically to the catalyst tubes is connected to the catalyst tubes, which longitudinal collecting tubes collect the product gas from the individual catalyst tubes and bundle the same in a main collecting line.

In so-called hot exhaust systems, first collecting tubes which receive the product gas of the catalyst tubes and a downstream main collecting tube which bundles the product gas from the first collecting tubes in one line are not insulated on the inside, whereas the exhaust system in its entirety is thermally insulated from outside, so that the temperature of the collecting tubes and the temperature of the outer wall of the main outlet substantially correspond to the temperature of the reformed product gas. The shell of the exhaust system thus must withstand the full heat of the product gas. Above all, it is disadvantageous that the high temperature input leads to thermal expansions in the material, which can significantly damage the structural integrity of the system. This is even amplified by recurring cooling phases. These effects are relevant above all when the vertically aligned catalyst tubes are firmly connected with the lower collecting tubes by a welded joint or the like.

The displacements and thermal expansions caused by the heat input lead to great loads and stress peaks in the connecting region between the components. In addition, there are deformations in conjunction with horizontal and vertical displacements, which additionally burden the system. To counter these effects, bent tubes known as "Pigtail" are used. The same connect the catalyst tubes with the horizontal longitudinal collecting tubes disposed thereunder and are able to compensate horizontal and vertical expansions and displacements of the longitudinal collecting tubes. It can, however, not be avoided that heating and cooling phases of the bent tubular compensators lead to stresses which are introduced into the collecting tubes. This can result in plastic deformations, whereby the longitudinal collecting tubes are shifted horizontally and are pulled or lifted in direction of the catalyst tubes. To compensate material expansions, the number of the catalyst tubes must be reduced, which limits the quantity of the catalyst tubes which can be installed inside the steam reformer furnace.

In the so-called cold exhaust systems, the interior of the exhaust system, the longitudinal collecting tubes and the main outlet line is provided with a heat-insulating layer. Due to the lining, the temperature on the outer surface of the collecting tubes is relatively low. In these systems, a compensating Pigtail connection can therefore be omitted, so that the catalyst tubes open directly into the exhaust system. For the direct connection, however, it is necessary that the longitudinal collecting tubes are provided with a number of connection openings on one side, which turns out to be complex and difficult with regard the to heat-insulating lining in the interior of the tubes, so that the insulation is not uniformly distributed. This can lead to an asymmetry with regard to the heat distribution in the upper and the lower structure of the exhaust system or the longitudinal collecting tubes, so that the same are distorted and displaced, whereby even fractures occur. Therefore, the construction of such system also involves comparatively high costs.

U.S. Pat. No. 4,647,436 A for example describes a tubular reforming furnace, in which the reaction or catalyst tubes extend out of the furnace at the bottom and outside the furnace open into a collecting line. The movements caused by the heat both in horizontal and in vertical direction of the catalyst tubes correspondingly must be taken into account in the formation of the lead-throughs through the furnace wall. To avoid damages and fractures, the same are to be dimensioned correspondingly large, in order to permit the movements of the exhaust system. Especially at these points, however, leakage can occur, so that air flows into the furnace, which effects a great heat loss inside the furnace and negatively influences the desired reactions.

Cold/hot exhaust systems represent the third group of exhaust systems and are a mixed form. In these systems, the exhaust system includes both conduits insulated on the inside and conduits not insulated on the inside. The catalyst tubes each are connected with a non-insulated collecting line, which due to the hot product gas has a correspondingly hot outer wall. The connection between collecting tube and catalyst tube is effected via Pigtail connections which have a small diameter. There are known exhaust systems in which catalyst tubes arranged in parallel are positioned grouped in rows, wherein each row is connected to a horizontal longitudinal collecting tube. The longitudinal collecting tubes are centrally connected with an internally lined coaxial main collecting tube. In general, the system is provided with two of such main collecting tubes, which are joined at one end and open into a main outlet line at one end of the reformer. Both the Pigtail connections and the hot-wall and also cold-wall collecting tubes are arranged outside the furnace.

In other cold/hot exhaust systems, the main collecting tube is arranged not coaxially, but transversely to the longitudinal collecting tubes. Beside upper ports for the catalyst tubes, the longitudinal collecting tubes have lateral ports for a transverse collector, wherein the ports for the catalyst tubes are non-uniformly distributed on both sides of the lateral port. The longitudinal collectors bundle the product gas of the catalyst tubes and are joined to one line by means of a transverse collector, wherein the transverse collector serves as main discharge line. Due to the mixed system and the great temperature differences in the materials of the tubes, differently large thermal expansions are obtained in the system, which place a mechanical load on a multitude of components of the exhaust system. The high loads in particular lead to the fact that the maximum length of the collecting tubes of the hot exhaust system and the temperature maximally tolerable by the construction are limited.

Thus, it is the object of the present invention to improve the resistance of an exhaust system for a steam reformer to thermal loads and expansions.

SUMMARY

According to the invention, this object is solved in that the transverse collector is arranged on a side of the longitudinal collecting tube facing away from the ports centrally to the longitudinal collecting tube. The central arrangement of the transverse collector below the longitudinal collecting tube leads to the fact that the longitudinal collecting tube extends at equal lengths proceeding from the point of intersection of the axis of the transverse collector with the axis of the longitudinal collecting tube.

The advantage of this construction in particular shows when several longitudinal collecting tubes are used, of which the transverse collector collects the product gas in the actual sense and does not discharge the same, as this will produce high heat fields distributed over various positions, which lead to strong local heat inputs and burden the system. In a multitude of longitudinal collecting tubes, which extend parallel to each other and in a coplanar fashion, i.e. in a common plane, their centers in axial direction lie on a common line extending transversely to the axes of the longitudinal collecting tubes. The catalyst tubes are grouped in parallel rows and with one row each connected to a longitudinal collecting tube. Due to this construction, the heat is symmetrically distributed in the longitudinal collecting tubes, so that the thermal expansion of the longitudinal collecting tubes uniformly horizontally extends in opposite directions proceeding from the point of connection to the transverse collector, whereby the distortion tendency is reduced. Even with strong deformations due to high temperatures, the integrity of the exhaust system remains stable. In some embodiments, the longitudinal collecting tubes each have the same length.

In some embodiments, the longitudinal collecting tubes are connected to the transverse collector by means of at least one T-piece, which divides the longitudinal collecting tubes into sections each having the same length. Via the T-piece, a transition between a hot and a cold system can be bridged, wherein the durability of the connection remains ensured even with great temperature differences. The T-piece absorbs the greatest stresses in the system.

According to a further embodiment of the invention, catalyst tubes can be connected directly to the longitudinal collecting tube. Other than in systems known from the prior art, in which the transverse collector arranged below the longitudinal collecting tubes is connected with the longitudinal collecting tubes via Pigtails, such Pigtails can be omitted here, whereby influences due to deformations of the Pigtails are excluded.

A further embodiment of the invention provides that the longitudinal collecting tubes are heat-insulated from outside. One longitudinal collecting tube each can be arranged in an insulating box which at least partly surrounds the longitudinal collecting tube. Thus, the heat can be enclosed in the furnace and the heat loss can be kept low. It was found to be particularly advantageous when the insulating box has a cover which can be opened in direction of the furnace chamber. Thus, it can be prevented that the longitudinal collecting tubes are not exposed to the full radiation heat of the furnace.

The object underlying the invention furthermore is solved by a bearing for supporting the exhaust system for a steam reformer, which amplifies the resistance of the exhaust system to thermal expansions and stresses resulting therefrom. Such bearing comprises a first bearing element and a second bearing element, wherein the second bearing element is arranged on a longitudinal collecting tube and/or a transverse collector, wherein the first bearing element and the second bearing element can move translatorily relative to each other, and wherein the bearing is formed such that the longitudinal collecting tube and/or the transverse collector are shifted in parallel obliquely to its longitudinal axis.

Due to thermal expansions in the exhaust system, horizontal and vertical displacements in particular of the longitudinal collecting tubes can occur, which can lead to high local stress peaks. The bearing thus represents a compensation system for the thermal expansions and displacements of the exhaust system. The exhaust system can be mounted in an almost floating manner on reinforced concrete supports which are arranged below the longitudinal collectors. The bearing according to the invention is designed such that the relative movement of the longitudinal collecting tube extends obliquely to the first bearing element. This movement is composed of two movements, wherein the first movement extends along the axis of the longitudinal collecting tube and absorbs lateral expansions, while the second component of movement extends in a direction perpendicular or vertical to the longitudinal axis of the longitudinal collecting tube and thus absorbs vertical displacements (e.g. buckling effects, bending effects). The result is a parallel displacement, by means of which the above-mentioned shifting effects are compensated.

The bearing according to the invention can be designed in a variety of ways. Thus, it is possible to use a ball bearing, but it was found to be particularly advantageous when the bearing is a plain bearing.

An embodiment provides that the first and the second bearing element are provided with sliding surfaces arranged parallel to each other, which are inclined towards the longitudinal axis of the longitudinal collecting tube. In some embodiments, the longitudinal collecting tube is mounted on at least two points on both sides of the transverse collector.

The bearing can be located inside an insulation such as an insulating box for the longitudinal collecting tubes. To avoid a heat flow in direction of the insulating box via the bearing supports, an insulating mat can be provided below the sliding points of the bearing, which prevents that hot points are formed on the wall of the insulation.

The invention furthermore relates to a steam reformer which includes at least one exhaust system according to the invention and/or a bearing according to the invention. An embodiment of such steam reformer provides that the transverse collector is arranged outside and in some embodiments below the furnace, wherein its axis extends centrally to the furnace.

In another embodiment of the steam reformer, the transverse collector is arranged outside and in some embodiments below a furnace, wherein its axis is offset with respect to the axial center of the furnace. In some embodiments, the transverse collector is shifted to the front and in particular arranged at about one third of the axial length of the furnace.

According to the invention, the steam reformer is used for producing a synthesis gas containing hydrogen.

In various embodiments, the invention includes an exhaust system for a steam reformer, comprising at least one longitudinal collecting tube, wherein along the longitudinal axis of the longitudinal collecting tube ports for connection to catalyst tubes are provided, which in the connected condition are aligned parallel to each other and vertically to the longitudinal collecting tube, a transverse collector which is connected to the at least one longitudinal collecting tube and has a longitudinal axis which extends vertically to the at least one longitudinal collecting tube and vertically to the catalyst tubes, wherein the longitudinal collecting tube is formed as hot exhaust system and the transverse collector is formed as cold exhaust system, characterized in that the transverse collector is arranged on a side of the longitudinal collecting tube facing away from the ports centrally to the longitudinal collecting tube.

In an embodiment, at least two longitudinal collecting tubes arranged parallel to each other.

In an embodiment, the longitudinal collecting tube is connected to the transverse collector by means of at least one T-piece.

In an embodiment, the longitudinal collecting tube is arranged inside an insulating box.

In an embodiment, the longitudinal collecting tube is supported by at least two bearings, such as bearings as described herein.

In an embodiment, the invention provides a bearing for supporting an exhaust system for a steam reformer, in particular as described herein, comprising a first bearing element and a second bearing element, wherein the second bearing element is arranged on a longitudinal collecting tube and/or a transverse collector, wherein the first bearing element and the second bearing element can translatorily move relative to each other, and wherein the bearing is formed such that the longitudinal collecting tube and/or the transverse collector is shiftable in parallel obliquely to the respective longitudinal axis.

In an embodiment, the first and the second bearing element are provided with sliding surfaces arranged parallel to each other, which are inclined towards the longitudinal axis of the longitudinal collecting tube.

In an embodiment, the invention provides a steam reformer with at least one exhaust system as described herein and/or a bearing as described herein.

In an embodiment, the transverse collector is arranged outside and in some embodiments below a furnace, wherein its axis extends centrally to the furnace.

In an embodiment, the transverse collector is arranged outside and in some embodiments below a furnace, wherein its axis is offset with respect to the axial center of the furnace.

In an embodiment, the invention provides use of a steam reformer as described herein for producing a synthesis gas containing hydrogen.

The invention will subsequently be explained in detail with reference to exemplary embodiments and the drawing. All features described and/or illustrated form the subject-matter of the invention per se or in any combination, independent of their inclusion in the claims or their back-reference.

DETAILED DESCRIPTION

Figure 1:
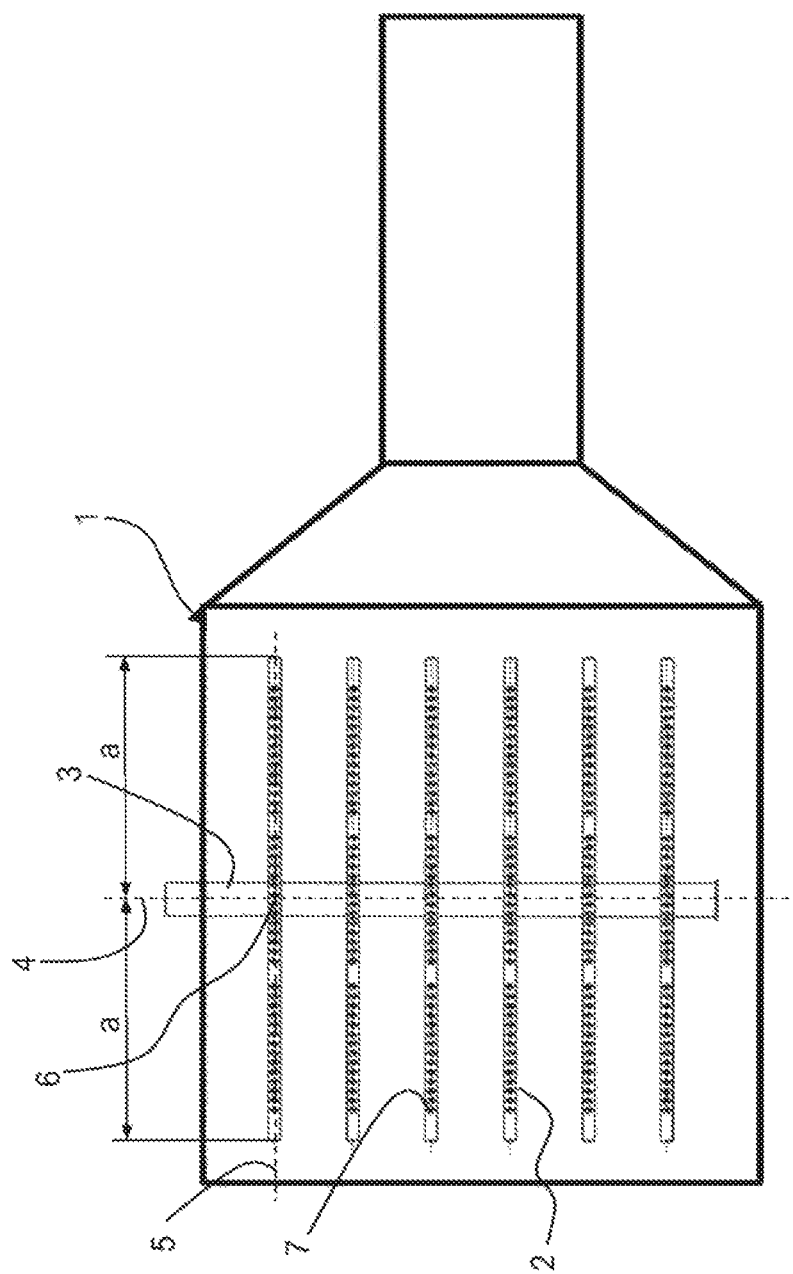
FIG. 1 shows an exhaust system for a steam reformer in a top view according to a first embodiment of the invention.

FIG. 1 shows an exhaust system arranged in a furnace 1 with six identical longitudinal collecting tubes 2 and a transverse collector 3, which is connected to each of the longitudinal collecting tubes 2 and serves as main outlet line.

The longitudinal collecting tubes 2 each are arranged in parallel spaced from each other, wherein they are located in a common plane and are not shifted in parallel relative to each other, so that their ends lie on a common line in longitudinal direction. The transverse collector 3 is arranged centrally below the longitudinal collecting tubes 2, wherein the longitudinal axis 4 of the transverse collector 3 is disposed in parallel and in the top view in FIG. 1 vertically to the longitudinal axis 5 of each of the longitudinal collecting tubes 2. In the top view, the six longitudinal collecting tubes 2 each lie on the longitudinal axis 4 of the transverse collector, so that the longitudinal collecting tubes 2 each extend proceeding from a center 6 of the longitudinal collecting tubes 2 or the longitudinal axis 4 of the transverse collector towards the ends in the same length a.

The longitudinal collecting tubes 2 are designed as hot exhaust system, whereas the transverse collector 3 is a cold exhaust system and includes an inner insulation, whereby the outer wall of the transverse collector 3 is comparatively cold. Along the longitudinal axis 5 of the longitudinal collecting tubes 2, on the upper side or the side of the longitudinal collecting tubes 2 facing away from the transverse collector 3, ports 7 for conduits are provided, to which non-illustrated catalyst tubes can be connected, wherein the same are connected with the longitudinal collecting tubes 2 vertically to the longitudinal axis 5 of the longitudinal collecting tubes 2. The axes of the transverse collector 3, the longitudinal collecting tubes 2 and the catalyst tubes thus are each vertical to each other. As is furthermore shown in FIG. 1, the ports 7 are uniformly distributed on the longitudinal collecting tubes 2. It thereby is ensured that the heat input into the longitudinal collecting tubes 2 is uniform along their length and there is no asymmetric distribution of heat.

Due to the arrangement according to the invention, twice the overall size (length) can be achieved with the same maximum thermal expansion of the longitudinal collecting tubes.

Figure 2:
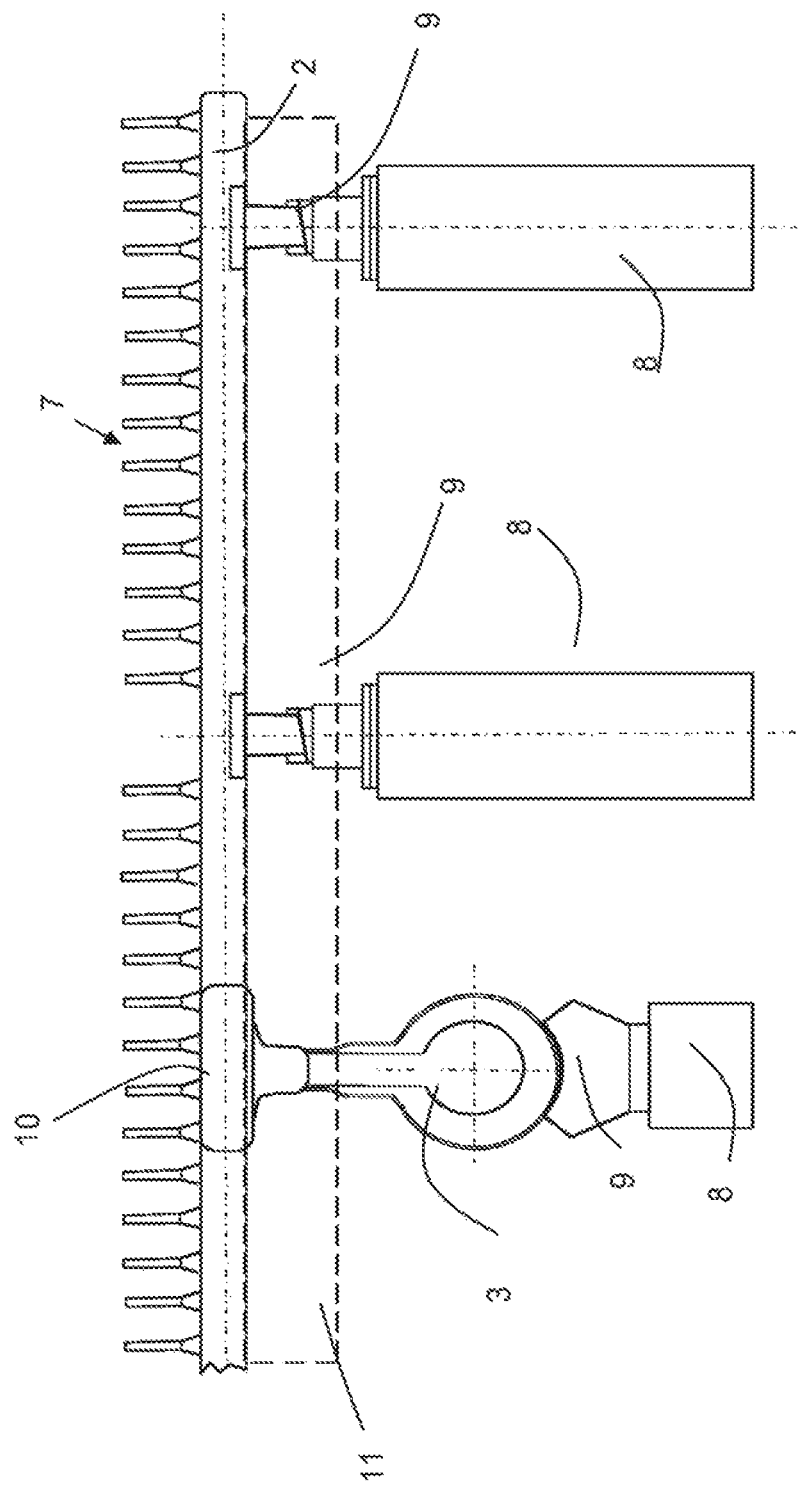
FIG. 2 shows an exhaust system with a bearing in a lateral sectional view according to a further embodiment of the invention, and FIG. 3 schematically shows the mode of operation of the bearing of FIG. 2.

FIG. 2 shows an expansion of the exhaust system of FIG. 1 in a side view with further functions. The longitudinal collecting tube 2 shown here and the transverse collector 3 arranged below the longitudinal collecting tubes 2 are mounted on a non-illustrated foundation via concrete supports 8. The same are provided with a special bearing 9 at their upper end. The transverse collector 3 arranged below the longitudinal collecting tubes 2 is firmly connected with the respective longitudinal collecting tube via a T-piece 10. In the region of connection of the transverse collector 3 to the T-piece 10 a transition portion is arranged between the hot system in the region of the longitudinal collecting tube and the cold system in the region of the transverse collector. This transition is realized by means of a cone which is supported by a connecting piece of the transverse collector.

On the upper side of the longitudinal collecting tubes 2 a plurality of ports 7 for catalyst tubes can be seen, which are vertically connected to the longitudinal collecting tubes 2. With broken lines 11 an insulating box is indicated, which encloses the exhaust system hot from the longitudinal collecting tubes 2, and the bearing 9.

When the steam reformer is operated, there are great temperature inputs into the longitudinal collecting tubes 2 and into the transverse collector 3, although there are great temperature differences between transverse collector and longitudinal collecting tubes. Due to thermal expansions, the system is subject to horizontal and vertical displacements. Due to the central arrangement of the transverse collector 3, these forces are absorbed below the longitudinal collecting tubes 3, so that there are no asymmetric distortions in the longitudinal collecting tubes 2. Instead, the same are expanded uniformly. The expansion is absorbed via the bearing 9.

Figure 3:
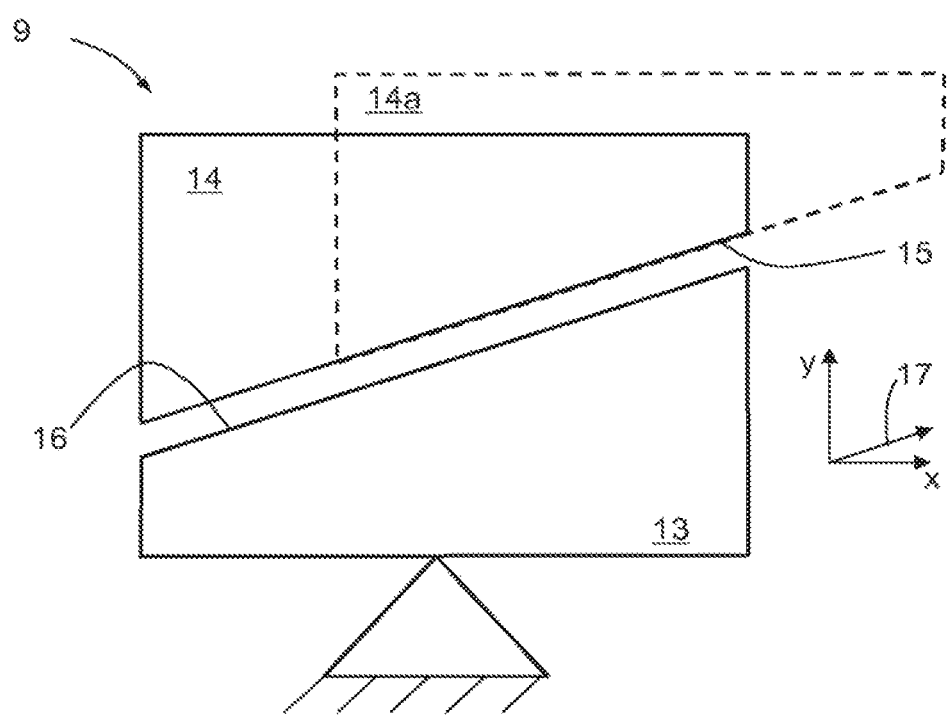

The mode of function and action of the compensation of horizontal and vertical displacements by the bearing 9 is shown schematically in FIG. 3. The bearing 9 is composed of a first bearing element 13 and a second bearing element 14, wherein the first bearing element 13 is connected with the concrete support 8, while the second bearing element 14 is connected to a transverse collector or a longitudinal collecting tube. The bearing 9 is formed as plain bearing. For this purpose, the first bearing element 13 and the second bearing element 14 each are provided with a sliding surface 15 and 16, respectively. The sliding surfaces 15 and 16 are formed as inclined plane, wherein they extend both in X- and in Y-direction. A non-illustrated longitudinal collecting tube, which is connected with the second bearing element 14, extends in X-direction.

With continuous lines, the second bearing element 14 is shown in a condition in which the system is in the cold condition. With broken lines 14a, the second bearing element 14 in addition is shown in the position which it takes in the hot condition, when the longitudinal collecting tubes 2 are thermally expanded due to heating.

At operating temperature, the bearing or the second bearing element 14 slides upwards along the inclined plane, as it is connected with the longitudinal collecting tube 2, wherein this shifting movement 17 is composed of a first component in X-direction and a second component in Y-direction. As can clearly be seen with reference to FIG. 3, the second bearing element 14 is shifted in parallel in the direction which is defined by the sliding surfaces 15 and 16. In this way, both vertical and horizontal expansions and displacements of the longitudinal collecting tubes are compensated. Deformation stresses, which otherwise cannot be compensated by usual support bearings, thereby are avoided. Due to the parallel displacement, the longitudinal collecting tubes remain straight, while they are expanded horizontally and vertically.

LIST OF REFERENCE NUMERALS 1 furnace
2 longitudinal collecting tube
3 transverse collector
4 longitudinal axis of transverse collector
5 longitudinal axis of longitudinal collecting tube
6 centers of longitudinal collecting tube
7 ports
8 concrete supports
9 bearing
10 T-piece
11 insulating box
13 first bearing element
14 second bearing element cold
14a second bearing element hot
15 sliding surface of first bearing element
16 sliding surface of second bearing element
17 shifting movement

The invention claimed is:

1. A bearing system for supporting an exhaust system for a steam reformer, wherein the exhaust system comprises a hot exhaust system comprising at least one longitudinal collecting tube and a cold exhaust system comprising a transverse collector, the bearing system comprising:
   a first bearing element and a second bearing element, wherein the second bearing element is configured to be arranged on the longitudinal collecting tube and/or the transverse collector of the exhaust,
   catalyst tubes aligned parallel to each other and orthogonally to the longitudinal collecting tube;
   a plurality of ports disposed along the longitudinal axis of a first side of the longitudinal collecting tube, wherein each port is configured to connect to a respective catalyst tube, wherein the ports are arranged such that in the connected condition, the catalyst tubes are aligned parallel to each other and orthogonally to the longitudinal collecting tube;
   wherein the first bearing element and the second bearing element are configured to translatorily move relative to each other, and wherein the bearing system is formed such that the longitudinal collecting tube and/or the transverse collector is shiftable in parallel obliquely to a respective longitudinal axis,
   wherein the first bearing element and the second bearing element are provided with sliding surfaces arranged parallel to each other, which are inclined towards the longitudinal axis of the longitudinal collecting tube.

2. The bearing system accordingly to claim 1, wherein the exhaust system comprises:
   wherein the transverse collector is fluidly connected to a second side of the longitudinal collecting tube and has a longitudinal axis which extends orthogonally to the longitudinal collecting tube and orthogonally to the catalyst tubes,
   wherein the second side of the longitudinal collecting tube is opposite of the first side the longitudinal collecting tube, wherein the transverse collector is disposed centrally to the longitudinal collecting tube.

3. The bearing system accordingly to claim 1, wherein the exhaust system comprises a second longitudinal collecting tube that is arranged parralel to the other longitudinal collecting tube.

4. The bearing system accordingly to claim 1, wherein the longitudinal collecting tube is connected to the transverse collector by means of at least one T-piece.

5. The bearing system accordingly to claim 1, wherein the longitudinal collecting tube is arranged inside an insulating box.

6. A bearing system configured to support an exhaust system for a steam reformer, the bearing system comprising a first bearing element and a second bearing element,
   wherein the exhaust system comprises:
   a hot exhaust system comprising at least one longitudinal collecting tube;
   catalyst tubes aligned parallel to each other and orthogonally to the longitudinal collecting tube,
   a plurality of ports disposed along the longitudinal axis of a first side of the longitudinal collecting tube, wherein each port is configured to connect to a respective catalyst tube, wherein the ports are arranged such that in the connected condition, the catalyst tubes are aligned parallel to each other and orthogonally to the longitudinal collecting tube; and
   a cold exhaust system comprising a transverse collector which is fluidly connected to a second side of the at least one longitudinal collecting tube and has a longitudinal axis which extends orthogonally to the at least one longitudinal collecting tube and orthogonally to the catalyst tubes,
   wherein the second side of the longitudinal collecting tube is opposite of the first side the longitudinal collecting tube, wherein the transverse collector is disposed centrally to the longitudinal collecting tube,
   wherein the second bearing element is arranged on the longitudinal collecting tube and/or the transverse collector,
   wherein the first bearing element and the second bearing element are configured to translatorily move relative to each other, and
   wherein the bearing system is formed such that the longitudinal collecting tube and/or the transverse collector is shiftable in parallel obliquely to the respective longitudinal axis.

7. The bearing system accordingly to claim 6, wherein the first bearing element and the second bearing element are provided with sliding surfaces arranged parallel to each other, which are inclined towards the longitudinal axis of the longitudinal collecting tube.

8. The bearing system accordingly to claim 6, wherein the exhaust system comprises a second longitudinal collecting tube that is arranged parralel to the other longitudinal collecting tube.

9. The bearing system accordingly to claim 6, wherein the longitudinal collecting tube is connected to the transverse collector-by means of at least one T-piece.

10. The bearing system accordingly to claim 6, wherein the longitudinal collecting tube is arranged inside an insulating box.

* * * * *